(12) United States Patent
Harris

(10) Patent No.: US 6,292,944 B1
(45) Date of Patent: Sep. 18, 2001

(54) RETURN PATH INGRESS IN A TWO-WAY CATV SYSTEM

(75) Inventor: James E. Harris, Indianapolis, IN (US)

(73) Assignee: Trilithic, Inc., Indianapolis, ID (US)

( * ) Notice: Subject to any disclaimer, the term of this patent is extended or adjusted under 35 U.S.C. 154(b) by 0 days.

(21) Appl. No.: 08/901,985

(22) Filed: Jul. 29, 1997

Related U.S. Application Data

(60) Provisional application No. 60/023,306, filed on Jul. 31, 1996.

(51) Int. Cl.[7] ....................................... H04N 7/10
(52) U.S. Cl. ........................ 725/107; 725/125; 348/192; 324/525; 324/512
(58) Field of Search ................................. 348/12, 6, 10, 348/192, 195; 455/423–425, 115; 324/512, 522, 525, 613, 528

(56) References Cited

U.S. PATENT DOCUMENTS

| | | | |
|---|---|---|---|
| 1,321,543 | * 11/1919 | Niswonger | 324/528 |
| 3,731,203 | 5/1973 | Lieberman . | |
| 3,750,022 | * 7/1973 | Curry et al. | 455/5.1 |
| 3,846,703 | 11/1974 | Stewart et al. . | |
| 3,886,454 | * 5/1975 | Oakley et al. | 455/4.2 |
| 3,924,187 | * 12/1975 | Dormans | 455/4.1 |
| 3,991,363 | * 11/1976 | Lathrop | 324/52 |
| 4,413,229 | * 11/1983 | Grant | 324/528 |
| 4,480,251 | * 10/1984 | McNaughton et al. | 340/604 |
| 4,491,968 | 1/1985 | Shimp et al. . | |
| 4,520,508 | 5/1985 | Reichert, Jr. . | |
| 4,920,533 | 4/1990 | Dufresne et al. . | |
| 4,982,440 | 1/1991 | Dufresne et al. . | |
| 5,020,134 | 5/1991 | Pecaut . | |
| 5,126,840 | 6/1992 | Dufresne et al. . | |
| 5,208,665 | 5/1993 | McCalley et al. . | |
| 5,251,324 | 10/1993 | McMullan, Jr. . | |
| 5,255,086 | * 10/1993 | McMullan et al. | 358/86 |
| 5,473,361 | * 12/1995 | Penney | 348/6 |
| 5,608,328 | * 3/1997 | Sanderson | 324/529 |
| 5,608,428 | * 3/1997 | Bush | 455/3.1 |
| 5,867,206 | * 2/1999 | Voight et al. | 348/12 |
| 5,881,362 | * 3/1999 | Eldering et al. | 455/4.2 |
| 5,966,410 | * 10/1999 | Freyman et al. | 348/13 |
| 6,160,990 | * 12/2000 | Kobayashi et al. | 455/5.1 |

OTHER PUBLICATIONS (Maloney; Locating Cable Faults; IEEE Trans. on Industry Applications; vol. IA–9, No. 4; pp. 380–394), Jul. 1973.*

* cited by examiner

*Primary Examiner*—Andrew Faile
*Assistant Examiner*—Reuben M. Brown
(74) *Attorney, Agent, or Firm*—Barnes & Thornburg

(57) ABSTRACT

A method and apparatus for locating the source of noise ingress into a CATV system return path by coupling a filter having a passband in the noise frequency bandwidth to the nodes between adjacent return path amplifiers. The filter is sequentially coupled to the nodes, working away from the CATV system headend. A signal level meter or the like monitors the effect on the noise of coupling the filter to the nodes. When a node is reached at which coupling of the filter to the node no longer has any effect on the signal level in the node, the source of the noise is isolated in the node immediately preceding the node under test.

15 Claims, 4 Drawing Sheets

RETURN PATH INGRESS IN A TWO-WAY CATV SYSTEM

This application claims benefit to provisional application No. 60/023,306 filed Jul. 31, 1996.

This invention relates to methods and apparatus for isolating a point of ingress of noise into communication circuits. It is disclosed in the context of CATV systems which include provision for both the transmission of cable channels downstream from the head end to subscribers and the return of commands and the like upstream from subscribers to the head end. Much of the noise introduced into such systems is introduced by the relatively poorer quality circuits including the wiring internal to the subscribers' homes and up to the CATV taps. Consequently, isolating a particular subscriber's circuit in some way and measuring the resulting ingress can provide an indication whether ingress is attributable to that subscriber's circuit.

Because the CATV system return amplifiers which amplify the signal returning from the circuit to the head end effectively isolate more upstream customers from the measurement, the method and apparatus of the present invention heavily load the return path between an adjacent pair of such amplifiers and measure the effect of such loading on the signal in the return path between the adjacent amplifiers. If the return path is heavily loaded, on the order of 15 dB or so, between an adjacent pair of such amplifiers in the return path bandwidth of ~5 MHz—~42 MHz, and ingress noise disappears from the return path between the adjacent amplifiers, that is an indication that the ingress noise source is further downstream away from the head end. If this process is conducted beginning at the head end and moving away from the head end, the ingress noise source can be accurately isolated between, for example, two return path amplifiers. Then, other techniques can be employed to isolate the particular source of the noise ingress, for example, inadequate shielding or a bad connection in a subscriber's circuit connected in the return path between those two amplifiers, and repair it.

The mechanism by which the loading is achieved is a lowpass filter having a cutoff frequency just above the typically ~5 MHz—~42 MHz return path frequency band. If the CATV system technician starts at the head end and works his or her way outwardly along the system from the head end, performing this process at each return amplifier, the ingress noise will continue to disappear from the signal returning to the headend until the technician reaches the amplifier immediately downstream from the section of the return path to which the noise source subscriber's circuit is connected. Then the technician will have isolated the noise source to one or at most a relatively few subscribers whose subscriber circuits can then be tested for noise ingress and repaired as necessary.

According to one aspect of the invention, a method is provided for detecting the source of a signal in a CATV circuit. The CATV circuit comprises a plurality of amplifiers, each having a first, or input port and a second, or output port. Nodes of the CATV circuit couple the second ports of respective amplifiers to the first ports of next adjacent amplifiers in the circuit. The method comprises the steps of proceeding along the circuit from node to node, determining at each node whether the signal is present, reaching a node at which the signal is not present, and determining that the signal source is in the node tested immediately preceding the node at which the signal is not present.

According to this aspect of the invention, the step of determining at each node whether the signal is present comprises the steps of providing a first filter having a passband including the signal frequencies, connecting the first filter to the node, and determining the effect on the signal of coupling the first filter to the node.

Further according to this aspect of the invention, the step of providing a filter having a passband including the signal frequencies includes the step of providing on the filter a third port for coupling to an instrument for measuring signal strength. The step of determining at each node whether the signal is present further comprising coupling the instrument to the third port and measuring the strength of the signal at the third port.

Additionally according to this aspect of the invention, the step of providing a first filter having a passband including the signal frequencies comprises the step of providing a first filter having a passband including the signal frequencies and a first characteristic impedance in the passband. The step of determining at each node whether the signal is present further comprises the step of providing a second filter having a passband including the signal frequencies and a second characteristic impedance in the passband, coupling the second filter to the node, and determining the effect on the signal of coupling the second filter to the node.

Additionally according to this aspect of the invention, the step of coupling the first filter to the node and the step of coupling the second filter to the node together comprise the steps of alternately coupling the first and second filters to the node.

Further according to this aspect of the invention, the second filter is coupled to the third port. The step of determining at each node whether the signal is present further comprises the step of comparing the strength of the signal with the first filter coupled to the node and the strength of the signal with the second filter coupled to the node.

According to another aspect of the invention, apparatus for detecting the source of a signal in a CATV circuit comprises a first filter having a passband including the signal frequencies, at least a first conductor for coupling the first filter to the node, and an instrument for determining the effect on the signal of coupling the first filter to the node.

According to this aspect of the invention, the first filter comprises a third port and the instrument comprises a signal strength meter. The apparatus further comprises at least a second conductor for coupling the signal strength meter to the third port.

Additionally according to this aspect of the invention, the first filter further comprises a first filter having a first characteristic impedance in the passband. The apparatus further comprises a second filter having a passband including the signal frequencies and a second characteristic impedance in the passband, and at least a third conductor for coupling the second filter to the node.

In addition, according to this aspect of the invention, the apparatus further comprises a switch for alternately coupling the at least first conductor and the at least third conductor to the node.

Additionally according to this aspect of the invention, the apparatus further comprises a fourth conductor for coupling the second filter to the third port.

Illustratively according to both aspects of the invention, the CATV circuit is the return circuit of a two-way CATV system from the subscriber taps to a CATV system headend, and the signal is noise entering the CATV system return path at a node between two adjacent return path amplifiers.

The invention may best be understood by referring to the following detailed description and accompanying drawings which illustrate the invention. In the drawings.

Figure 1:
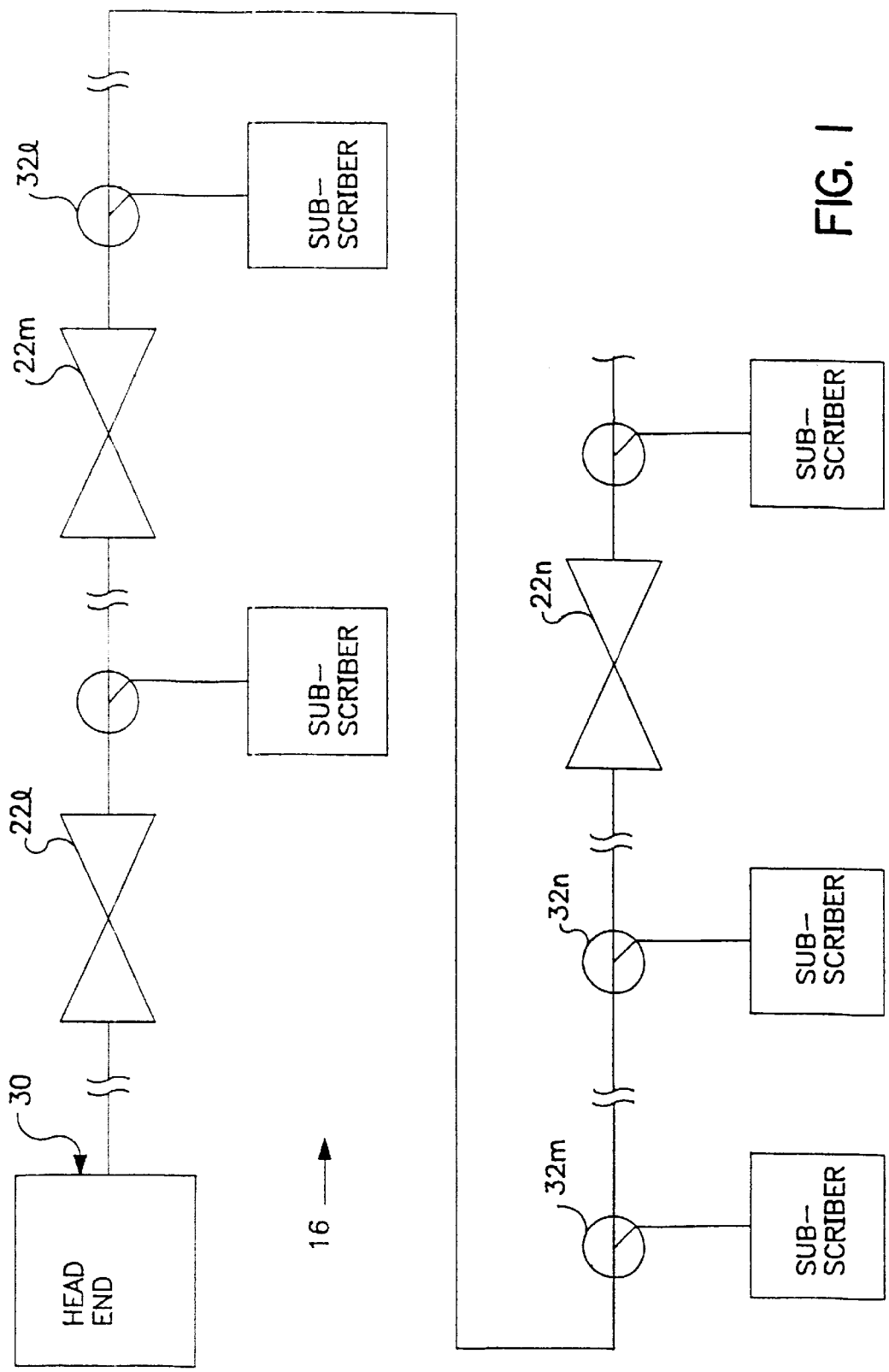
FIG. 1 illustrates a fragmentary, partly block and partly schematic diagram of a CATV system.
Figure 2:
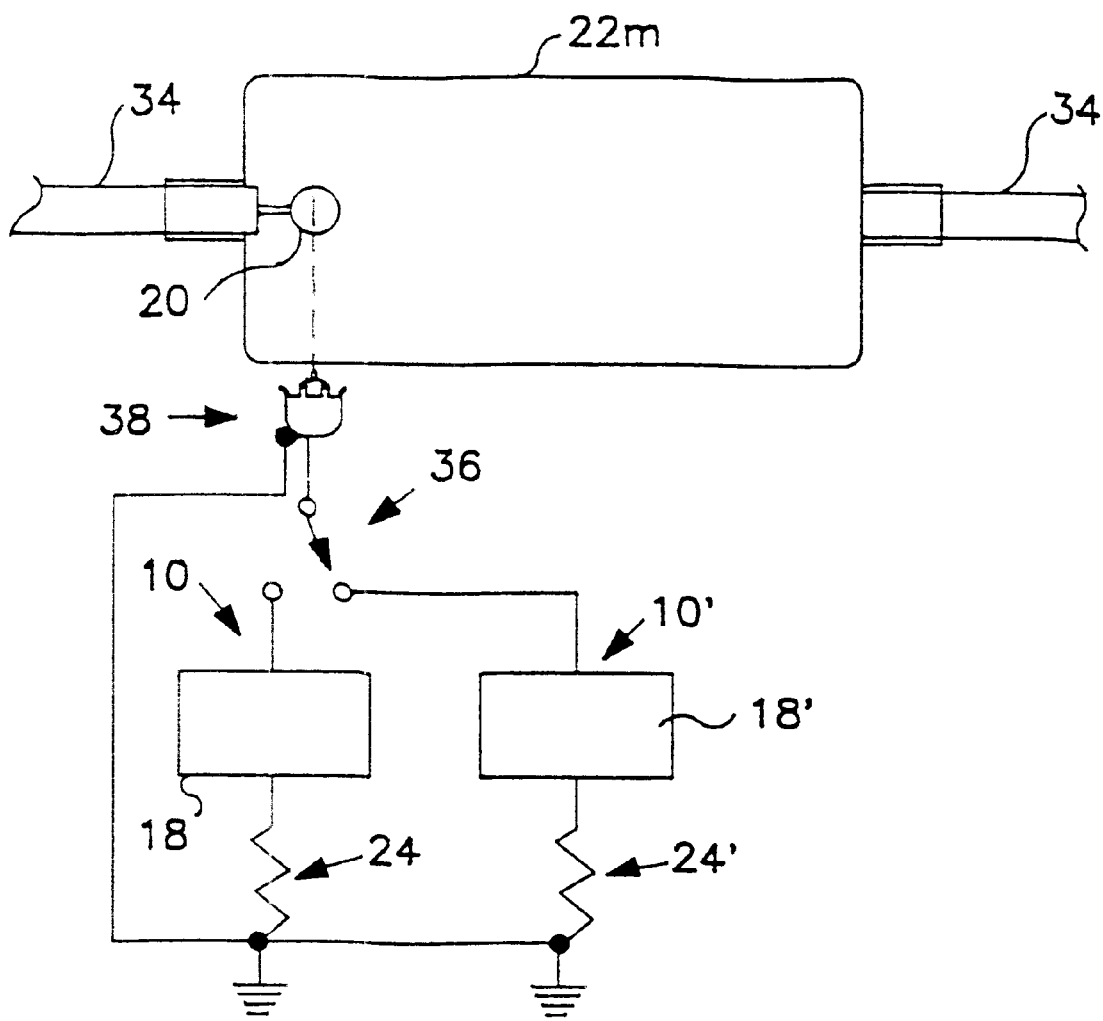
FIG. 2 illustrates a partly block and partly schematic diagram of a detail of the system illustrated in FIG. 1 with a circuit constructed according to the invention coupled into the system.

Referring now particularly to FIGS. 1–2, circuits 10 constructed according to the present invention are used to troubleshoot noise ingress at the return path frequencies (~5 MHZ to ~42 MHz) of a two-way CATV distribution system or circuit 16. The circuit 10 contains a frequency-selective filter 18 in the ~5 MHZ to ~42 MHZ return path bandwidth. Illustratively, filter 18 is a 35 MHZ low pass filter with an impedance at the corner frequency in the range of about 5Ω. When circuit 10 is connected to the input test point 20 of a selected return path amplifier 22m, it heavily loads (5Ω plus the external load resistance 24 of 5Ω, for example) the return path at and below the filter 18 corner frequency. An illustrative loading would be 15 dB, for example. The CATV system technician observes the result using an ingress-measuring return path analyzer 26 such as, for example, the Trilithic, Inc. model 9580 return path analyzer or its equivalent. If connecting the circuit 10 causes the measured ingress to decrease, then the source of the ingress is further downstream in the CATV system 16, "downstream" meaning away from the CATV system 16 head end 30. If connecting the circuit 10 does not cause the measured ingress to decrease, then the source of the ingress is upstream in the CATV system 16, "upstream" meaning toward the CATV system 16 head end 30. By proceeding down the line of return path amplifiers . . . ; 22l, 22m, 22n . . . and then proceeding through the subscriber taps . . . , 32l, 32m, 32n, . . . connected between the selected return path amplifiers 22m, 22n, the technician isolates the ingress noise source.

As previously noted, filter 18 is a low pass filter having a corner frequency in the return path frequency bandwidth. It has a low characteristic impedance in the range of a few ohms in that bandwidth, but presents a relatively higher impedance, for example, in the 150Ω range, in the forward path frequency bandwidth typically ~50 MHz—~700 MHz. Filter 18 is terminated in its characteristic impedance 24 to the return path bandwidth. Circuit 10 is equipped with a shunt-type input connector 38 that permits circuit 10 to be connected directly to the coaxial CATV system 16 cable 34 where the cable 34 enters the amplifier . . . , 22l, 22m, 22n, . . . housings. This type of connector is currently in common use in a test probe assembly often referred to as an "SPD" and available from several different sources.

Two such circuits 10 and 10' can be provided, along with a switch 36. Circuit 10', with its filter 18' having a relatively higher characteristic impedance and a matching, relatively higher external load resistor 24', operates at a different level of loading, illustratively 6 dB. Switching of switch 36 to circuit 10' permits the CATV system technician to detect a level change without disrupting traffic in the return path frequencies. Throwing of switch 36 permits heavy loading of signals in the return path frequencies. Neither position of switch 36 has any effect on the forward path frequencies.

Figure 3:
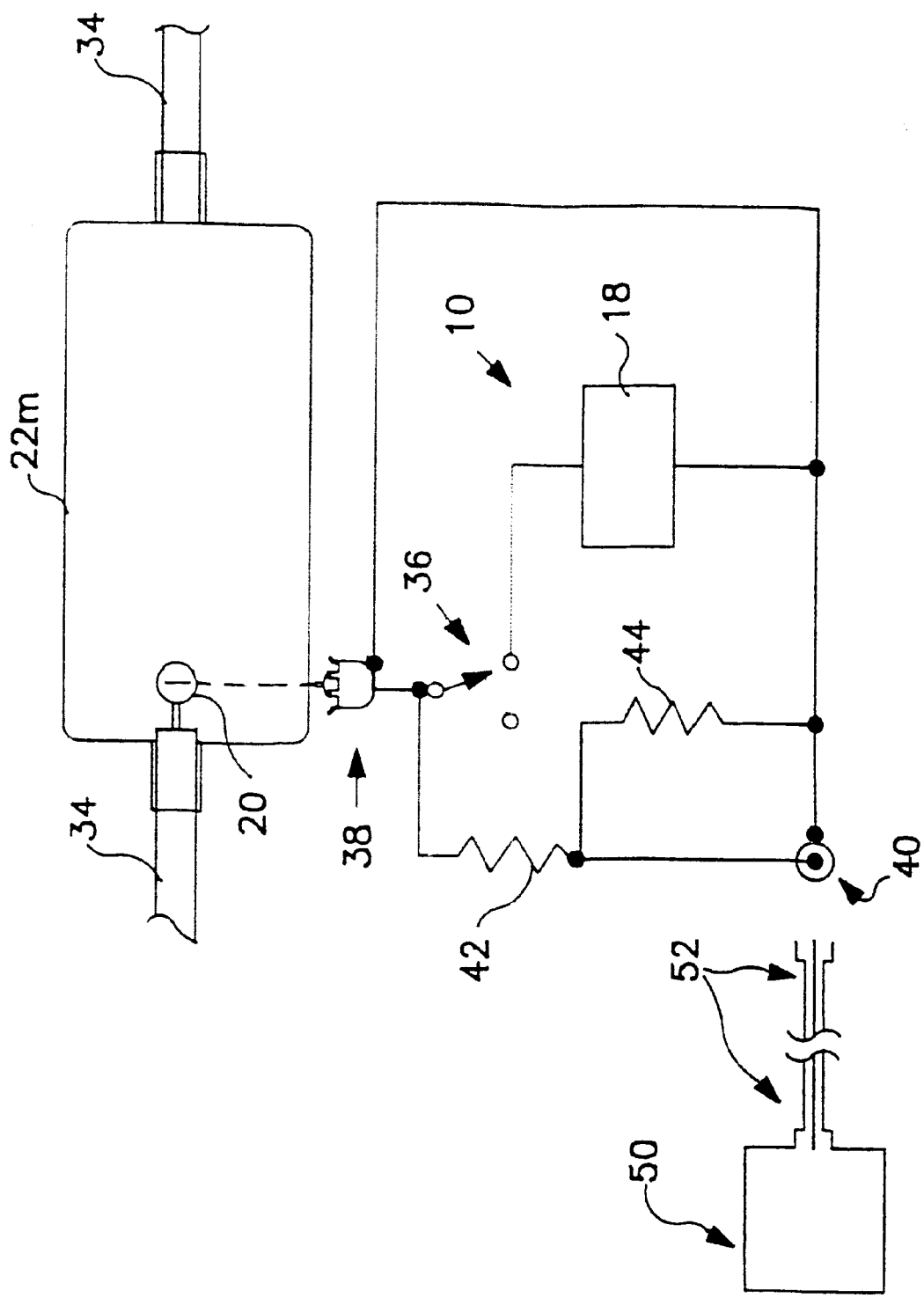
FIG. 3 illustrates a partly block and partly schematic diagram of a detail of the system illustrated in FIG. 1 with a circuit constructed according to the invention coupled into the system; and, FIG. 4 illustrates a partly block and partly schematic diagram of a detail of the system illustrated in FIG. 1 with a circuit constructed according to the invention coupled into the system.

Another circuit 10 constructed according to the present invention is illustrated in FIG. 3. In this embodiment, in addition to the frequency selective filter 18 and a switch 36, the circuit 10 includes a port 40, such as, for example, a coaxial cable connector, for connecting a meter 50, such as, for example, a signal level meter of any of a number of available types, to the circuit 10 when the circuit 10 is being used to test the system 16. Illustratively, filter 18 provides 6 dB of attenuation to signals in the frequency range of interest, and no appreciable attenuation to signals outside that frequency range. The movable contact of switch 36 is coupled to the center conductor of, for example, an SPD connector 38 or a length of coaxial cable by which the circuit 10 is coupled to the return path amplifier 22m. The circuit 10 illustrated in FIG. 3 also has, however, port 40 by which the signal level meter 50 or the like can be coupled to circuit 10 to monitor the effect of operation of switch 36. Port 40 includes a center conductor which is coupled through an attenuating resistor 42 to the center conductor of connector 38. The value of resistor 42 is selected based upon how much attenuation of the signal appearing at connector 38 is desired before that signal is supplied to the meter 50. In a typical installation, a resistor 42 value of 2 KΩ can provide an attenuation in the range of 30 dB, and a resistor 42 value in the range of 1 KΩ can provide an attenuation in the range of 20 dB to the signal at connector 38 to condition that signal for application to a meter coupled to port 40. A resistor 44 having the characteristic impedance of, for example, the coaxial cable 52 used to couple the meter 50 to port 40, is coupled across the center conductor and outer conductor of the port 40 connector. Illustratively, the resistance of resistor 44 is 75Ω.

Figure 4:
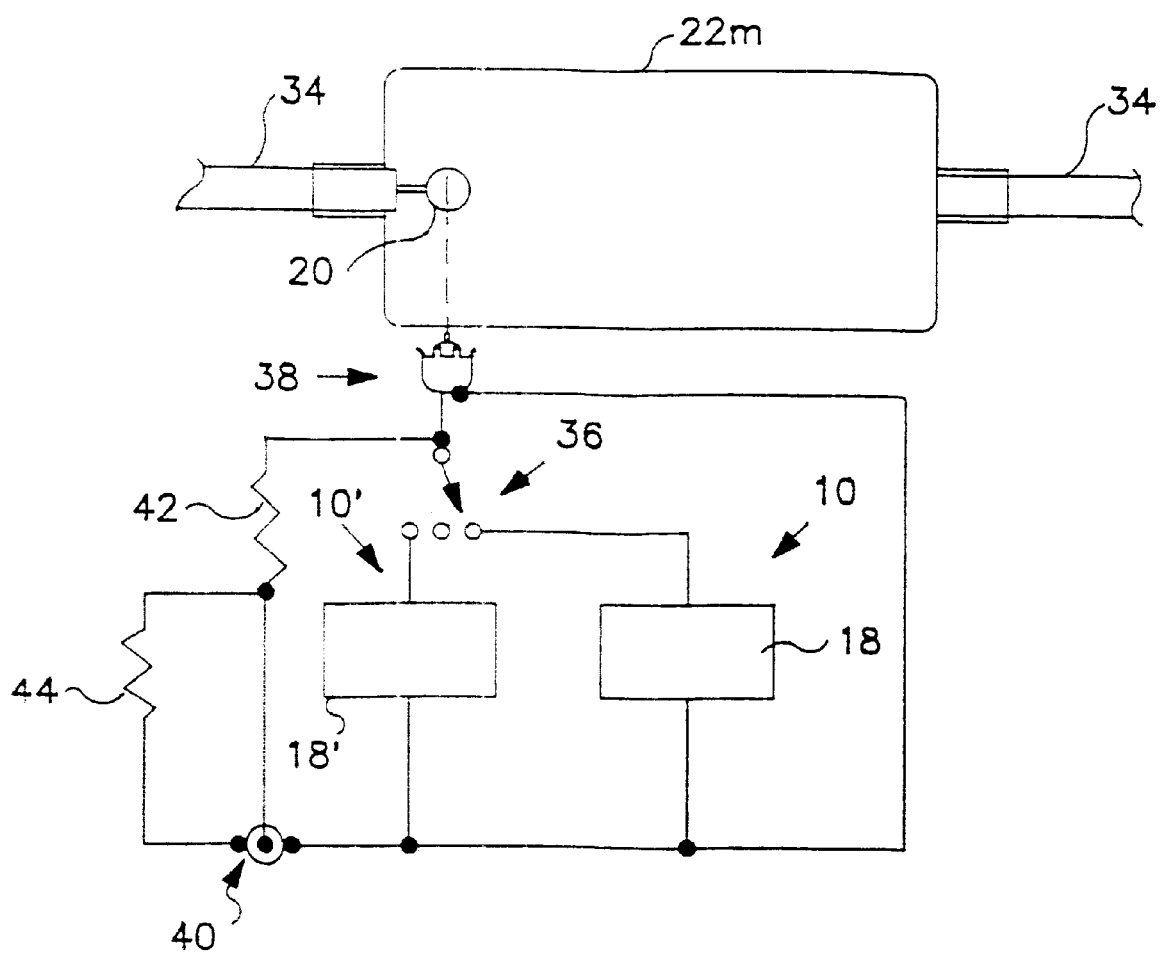

In another embodiment of circuit 10 illustrated in FIG. 4, elements of the circuits of FIGS. 2 and 3 are combined. Circuits 10 and 10' providing two different levels of attenuation, illustratively 6 dB and 12 dB, respectively, are selectable by switch 36. In addition, a meter input attenuating resistor 42 and a terminating resistor 44, the values of which are selected in accordance with the above-mentioned general principles, are coupled across the center conductors of connectors 38 and 40, and across the center conductor and outer conductor of connector 40, respectively.

What is claimed is:

1. A method for detecting the source of noise in a CATV circuit, the CATV circuit comprising a plurality of amplifiers, each amplifier having a first, input port and a second, output port, a node coupling the second port of a respective amplifier to the first port of the next adjacent amplifier in the circuit, the method comprising the steps of proceeding along the circuit away from the CATV circuit headend from node to node, determining at each node whether the noise is present, reaching a node at which the noise is not present, and determining that the noise source is in the node tested immediately preceding the node at which the noise is not present.

2. The method of claim 1 wherein the step of determining at each node whether the noise is present comprises the steps of providing a first filter having a passband including the noise frequencies, coupling the first filter to the node, and determining the effect on the noise of coupling the first filter to the node.

3. The method of claim 2 wherein the step of providing a filter having a passband including the noise frequencies includes the step of providing on the filter a third port for coupling to an instrument for measuring signal strength, the step of determining at each node whether the noise is present further comprising coupling the instrument to the third port and measuring the strength of the noise at the third port.

4. The method of claim 3 wherein the step of providing a first filter having a passband including the noise frequencies comprises the step of providing a first filter having a passband including the noise frequencies and a first characteristic impedance in the passband.

5. The method of claim 4 wherein the step of determining at each node whether the noise is present further comprises the step of providing a second filter having a passband including the noise frequencies and a second characteristic impedance in the passband, coupling the second filter to the node, and determining the effect on the noise of coupling the second filter to the node.

6. The method of claim 5 wherein the step of coupling the first filter to the node and the step of coupling the second filter to the node together comprise the steps of alternately coupling the first and second filters to the node.

7. The method of claim 6 wherein the second filter is coupled to the third port, the step of determining at each node whether the noise is present further comprising comparing the strength of the noise with the first filter coupled to the node and the strength of the noise with the second filter coupled to the node.

8. The method of claim 2 wherein the step of providing a first filter having a passband including the noise frequencies comprises the step of providing a first filter having a passband including the noise frequencies and a first characteristic impedance in the passband, the step of determining at each node whether the noise is present further comprising the step of providing a second filter having a passband including the noise frequencies and a second characteristic impedance in the passband, coupling the second filter to the node, and determining the effect on the noise of coupling the second filter to the node.

9. The method of claim 8 wherein the step of coupling the first filter to the node and the step of coupling the second filter to the node together comprise the steps of alternately coupling the first and second filters to the node.

10. The method of claim 9 wherein the second filter is coupled to the third port, the step of determining at each node whether the noise is present further comprising comparing the strength of noise with the first filter coupled to the node and the strength of the noise with the second filter coupled to the node.

11. Apparatus for detecting the source of noise in a CATV circuit, the CATV circuit comprising a plurality of amplifiers, each amplifier having a first, input port and a second, output port, a node coupling the second port of a respective amplifier more downstream in the CATV circuit away from the headend to the first port of the next adjacent amplifier more upstream in the CATV circuit toward the headend, the apparatus comprising a first filter having a passband including the noise frequencies, at least a first conductor for coupling the first filter to the node, and an instrument for determining the effect on the noise of coupling the first filter to the node.

12. The apparatus of claim 11 wherein the first filter comprises a third port and the instrument comprises a signal strength meter, the apparatus further comprising at least a second conductor for coupling the signal strength meter to the third port.

13. The apparatus of claim 12 wherein the first filter further comprises a first filter having a first characteristic impedance in the passband, the apparatus further comprising a second filter having a passband including the noise frequencies and a second characteristic impedance in the passband, and at least a third conductor for coupling the second filter to the node.

14. The apparatus of claim 13 and further comprising a switch for alternately coupling the at least first conductor and the at least third conductor to the node.

15. The apparatus of claim 14 and further comprising at least a fourth conductor for coupling the second filter to the third port.

* * * * *